(12) United States Patent
Hebel et al.

(10) Patent No.: US 10,087,630 B2
(45) Date of Patent: Oct. 2, 2018

(54) BAMBOO COMPOSITE MATERIAL FOR STRUCTURAL APPLICATIONS AND METHOD OF FABRICATING THE SAME

(71) Applicants: EIDGENOESSISCHE TECHNISCHE HOCHSCHULE ZURICH (SWISS FEDERAL INSTITUTE OF TECHNOLOGY ZURICH), Zurich (CH); ETH SINGAPORE SEC LTD, Singapore (SG)

(72) Inventors: Dirk Hebel, Zurich (CH); Felix Heisel, Singapore (SG)

(73) Assignees: EIDGENOESSISCHE TECHNISCHE HOCHSCHULE ZURICH (SWISS FEDERAL INSTITUTE OF TECHNOLOGY ZURICH), Zurich (CH); ETH SINGAPORE SEC LTD, Singapore (SG)

( * ) Notice: Subject to any disclaimer, the term of this patent is extended or adjusted under 35 U.S.C. 154(b) by 170 days.

(21) Appl. No.: 14/771,514

(22) PCT Filed: Mar. 6, 2014

(86) PCT No.: PCT/SG2014/000109
§ 371 (c)(1),
(2) Date: Aug. 31, 2015

(87) PCT Pub. No.: WO2014/137294
PCT Pub. Date: Sep. 12, 2014

(65) Prior Publication Data
US 2017/0114541 A1    Apr. 27, 2017

Related U.S. Application Data

(60) Provisional application No. 61/773,248, filed on Mar. 6, 2013.

(51) Int. Cl.
E04C 5/07    (2006.01)
E04C 5/16    (2006.01)
B29K 711/00  (2006.01)

(52) U.S. Cl.
CPC ............... E04C 5/07 (2013.01); E04C 5/168 (2013.01); *B29K 2711/00* (2013.01);
(Continued)

(58) Field of Classification Search
CPC ..... B29K 2711/00; E04C 5/073; E04C 5/168; Y10T 156/1059; Y10T 156/1067;
(Continued)

(56) References Cited

U.S. PATENT DOCUMENTS 5,814,170 A    9/1998  Shibusawa
5,840,226 A   11/1998  Fujii
(Continued)

FOREIGN PATENT DOCUMENTS

CN    1284424 A    2/2001
CN  201406830 Y    2/2010
(Continued)

OTHER PUBLICATIONS

Newsweek Staff, Stronger Than Steel, Apr. 2008, 7 pages.*
(Continued)

*Primary Examiner* — Linda Lamey Gray
(74) *Attorney, Agent, or Firm* — Volpe and Koenig, P.C.

(57) ABSTRACT

A bamboo composite material for structural applications and method of fabricating the same are provided. The method can comprise the steps of providing a bamboo culm; separating a slice or sheet from the bamboo culm such that the slice or sheet has a longitudinal axis along a fiber direction of the bamboo culm; at least partially detaching individual fiber bundles of the slice or sheet from each other along the
(Continued)

longitudinal axis of the slice or sheet; applying a glue to the slice or sheet; and curing the glued slice or sheet.

13 Claims, 14 Drawing Sheets

(52) U.S. Cl.
CPC .......... *E04C 5/073* (2013.01); *Y10T 156/1059* (2015.01); *Y10T 156/1067* (2015.01); *Y10T 156/1069* (2015.01); *Y10T 156/1075* (2015.01); *Y10T 156/13* (2015.01); *Y10T 156/1322* (2015.01)

(58) Field of Classification Search
CPC .......... Y10T 156/1075; Y10T 156/1069; Y10T 156/13; Y10T 156/1322
See application file for complete search history.

(56) References Cited

U.S. PATENT DOCUMENTS

| | | | |
|---|---|---|---|
| 6,391,435 B1 | 5/2002 | Akiyama | |
| 6,576,331 B1 | 6/2003 | Ryan | |
| 7,393,156 B1 | 7/2008 | Dunstan | |
| 7,939,156 B1 * | 5/2011 | Slaven, Jr. | ........... B27N 1/00 428/105 |
| 2005/0161852 A1 | 7/2005 | Decker | |
| 2008/0023868 A1 | 1/2008 | Slaven | |
| 2010/0178451 A1 | 7/2010 | Li | |
| 2011/0045243 A1 | 2/2011 | Dossche | |

FOREIGN PATENT DOCUMENTS

| | | |
|---|---|---|
| CN | 101774191 A | 7/2010 |
| CN | 102275200 A | 12/2011 |
| JP | 06170812 A * | 6/1994 |

OTHER PUBLICATIONS

Office Action issued in corresponding Chinese Patent Application No. 201480012404.0 dated Mar. 17, 2017, consisting of 13 pp.
International Search Report and Written Opinion dated corresponding International Patent Application No. PCT/SG2014/000109 dated Jun. 12, 2014, consisting of 10 pp.
Office Action dated Oct. 17, 2017 in counterpart Chinese Patent Appln. No. 201480012404.0 consisting of 12 pp.

* cited by examiner

BAMBOO COMPOSITE MATERIAL FOR STRUCTURAL APPLICATIONS AND METHOD OF FABRICATING THE SAME

FIELD OF THE INVENTION

This application relates to a bamboo composite material for structural applications and a method of fabricating the same, including, but not limited to, bamboo composite materials acting as reinforcement systems within concrete elements.

BACKGROUND

U.S. Pat. No. 7,939,156 discloses a composite concrete/bamboo structure. The structure includes layers formed of bamboo segments, which have been dried. The segments are substantially free of outer nodes, husk, and inner membrane material. The longitudinal axes of the segments in each layer are arranged generally parallel to one another and are also arranged in a mould to surround the surface of a cured concrete core. The entire structure is heated, compressed, and bonded together such that the bamboo layers cure around the concrete core to form a single integral composite concrete/bamboo structure.

US 2010/0178451 discloses a method for producing bamboo boards and products. Each elongated bamboo strip is squeezed by feeding through a roller press such that raised-notch staggered bands are formed, with the bands continuously connected to an immediately adjacent band.

US 2011/0045243 A1 discloses engineered wood products that are provided by adding adhesives to alternating layers of bamboo and cork or other lignocellulostic or recycled materials. The wood products can have varied appearances, which are attained with stains and the vertical or horizontal cuts applied to the products.

Bamboo plants are one of the fastest growing natural resources in the world. Belonging to the family of grasses, bamboo grows much faster than wood. It is usually available in great quantities and is easy to obtain.

Embodiments of the present invention seek to provide an alternative bamboo composite material for structural applications and methods of fabricating the same.

SUMMARY

In accordance with a first aspect of the present invention, there is provided a method of fabricating a composite material for structural applications, the method comprising the steps of providing a bamboo culm; separating a slice or sheet from the bamboo culm such that the slice or sheet has a longitudinal axis along a fiber direction of the bamboo culm; at least partially detaching individual fiber bundles of the slice or sheet from each other along the longitudinal axis of the slice or sheet; applying a glue to the slice or sheet; and curing the glued slice or sheet.

In accordance with a second aspect of the present invention, there is provided a composite material for structural applications, comprising a slice or sheet of bamboo fiber bundles, the slice or sheet having a longitudinal axis along a fiber direction of the fiber bundles; and a cured glue applied to the slice or sheet; wherein the cured glue fills a gap between at least partially un-attached adjacent fiber bundles of the slice or sheet along the longitudinal axis of the slice or sheet.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

The example embodiments described provide a bamboo composite material for structural applications and a method of fabricating the same, including, but not limited to, bamboo composite materials acting as reinforcement systems within concrete elements. Other structural applications include the use of the bamboo material as an individual structural material for e.g. building industry, automotive and aerospace industry or product design.

In the following descriptions, details are provided to further explain embodiments of possible applications. It shall be apparent to one skilled in the art, however, that the embodiments may be practiced without such details.

Some parts of the embodiments, which are shown in the Figs., have similar parts. The similar parts have the same names or similar part numbers with a prime symbol or with an alphabetic symbol. The description of such similar parts also applies by reference to other similar parts, where appropriate, thereby reducing repetition of text without limiting the disclosure.

Figure 1:
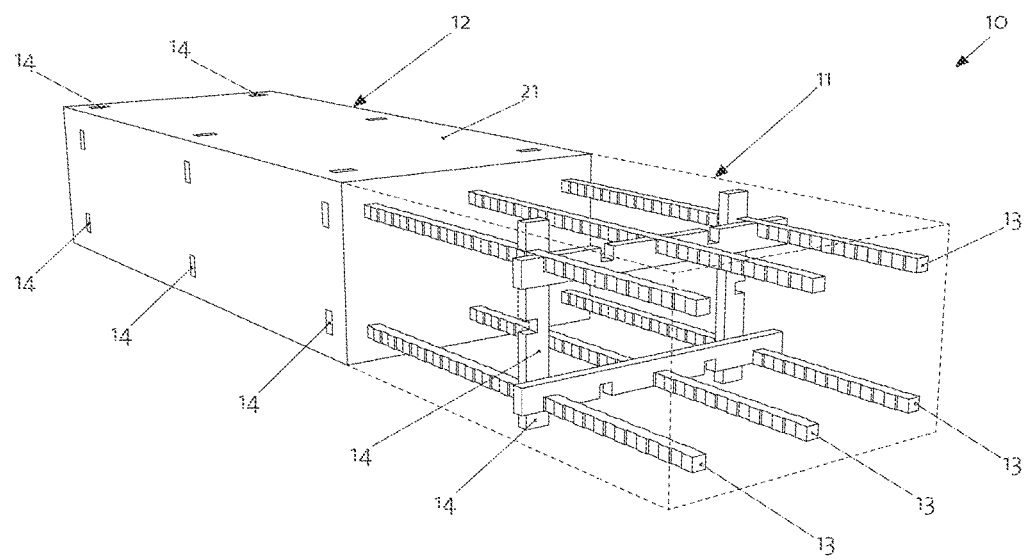
FIG. 1 illustrates a cutaway view of a reinforced concrete element according to an example embodiment.
Figure 2:
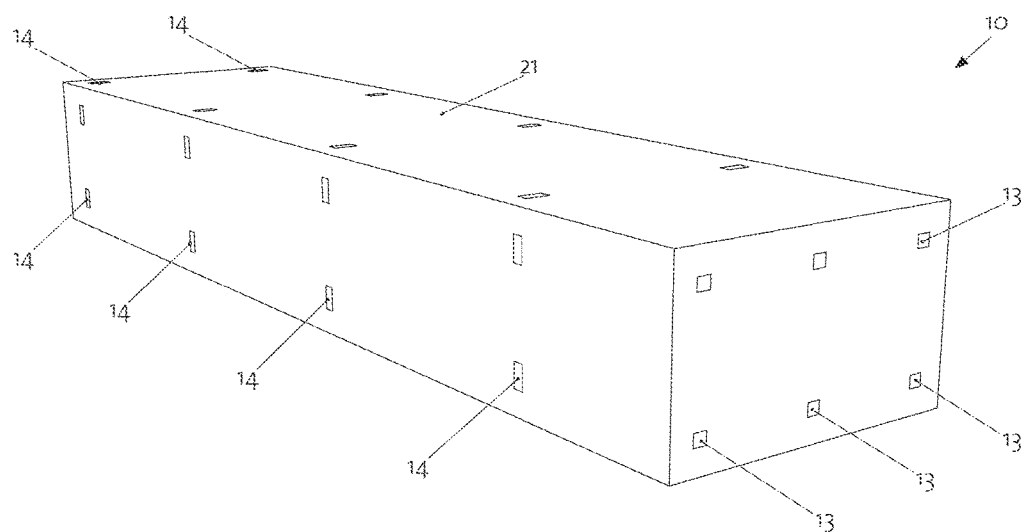
FIG. 2 illustrates a perspective view of the reinforced concrete element of FIG. 1.

FIGS. 1 and 2 show an example embodiment of a reinforced concrete element 10, which comprises several bamboo composite reinforcement components 11 and a cured concrete mixture 12 that surrounds the bamboo composite reinforcement components 11. It will be appreciated that the reinforced concrete element 10 may be referred to as a bamboo composite material in its entirety, comprising at least bamboo, a glue applied to the bamboo, and concrete. It will also be appreciated that the composite reinforcement components 11 may individually be referred to as a bamboo composite material, comprising at least bamboo and the glue applied to the bamboo.

The reinforced concrete element 10 can appear in any form, shape, dimension, length, thickness, or height.

The bamboo composite components 11 act as a reinforcement system for structural applications, herein in reinforced concrete, and they include one or more bamboo composite bars 13 with one or more corresponding bamboo composite connectors 14. The connectors 14 are also referred to herein as spacers. It is noted that the spacers can be made from other material than bamboo in different embodiments. For example, the spacers may be made from steel, plastic, etc. The spacers 14 primarily hold the bamboo composite bars 13 in place and act as a stir up reinforcement.

Figure 3:
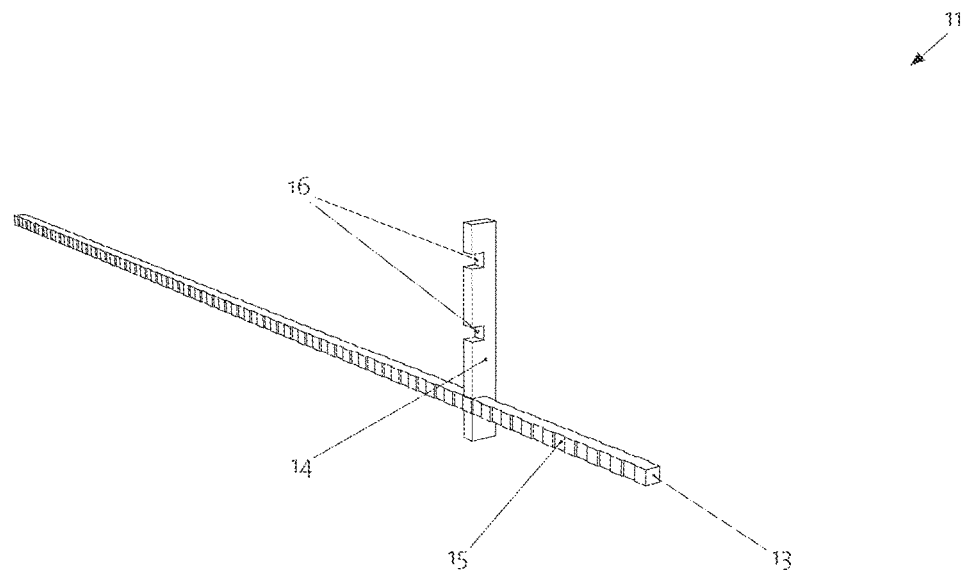
FIG. 3 illustrates a perspective view of a partial arrangement of bamboo composite reinforcement components for the reinforced concrete element of FIG. 1, according to an example embodiment.

Each bamboo composite bar 13 acts as a reinforcement system for the reinforced concrete element 10. As seen in FIG. 3, the bamboo composite bar 13 has a shape of a generally elongated rectangular block with multiple grooves or impressions 15, which are disposed along the direction of the longitudinal axis of the bamboo composite bar 13. The longitudinal axis of the bamboo composite bar 13 is parallel to the fiber direction in the bamboo composite bar 13.

Each bamboo composite connector 14 has a shape of an elongated rectangular block with corresponding slots 16 to accommodate a firm fit with the bamboo composite bars 13.

The said impressions 15 and the above-mentioned slots 16 are dimensioned such that a certain amount of pressure is preferably required to overcome friction for placing each of the impressions 15 into its corresponding slot 16. This friction placement causes the reinforcement bar 13 to be secured to the bamboo composite connector 14 in this embodiment.

Different ways of arranging or combining the bamboo composite reinforcement components 11 to act as a reinforcement system for structural concrete applications are possible in different embodiments. The bamboo composite connectors 14 could also—given a different form and shape—act as a stir-up reinforcement. The application example shown here could also incorporate the teaching of the bamboo composite swarm-reinforcement components shown in FIGS. 13-20.

FIG. 3 depicts a partial arrangement of bamboo composite components 11 for acting as a reinforcement system in the reinforced concrete element 10 in an example embodiment. This arrangement shows a connection of the bamboo composite bar 13 to the bamboo composite connector 14 at about a right angle.

Figure 4:
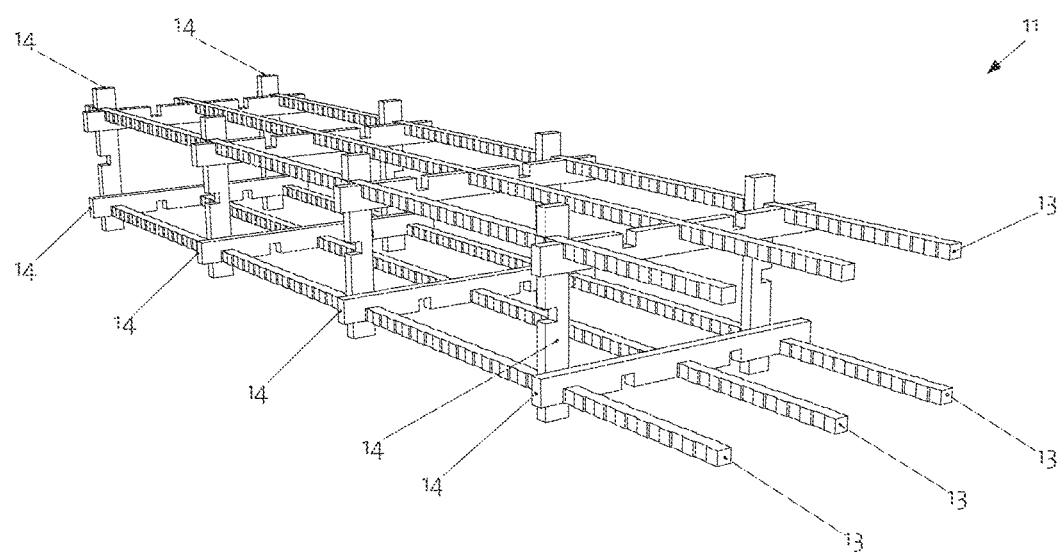
FIG. 4 illustrates a perspective view of an arrangement of bamboo composite reinforcement components for the reinforced concrete element of FIG. 1, according to an example embodiment.

FIG. 4 shows an arrangement of the bamboo composite components 11 acting as a reinforcement system in the reinforced concrete element 10 according to an example embodiment. The arrangement includes the multiple bamboo composite bars 13 and a plurality of the bamboo composite connectors 14. Each reinforcement bamboo composite bar 13 is put into position and is connected to its neighbouring element, a nearby reinforcement bamboo composite bar 13, via the bamboo composite connectors 14.

The arrangement shown can also include other variations of bamboo composite components acting as a reinforcement system in structural concrete applications such as—for example—swarm reinforcement components, see FIGS. 13-20.

The embedding of bamboo composite reinforcement components 11, which acts as a reinforcement system in reinforced concrete applications, inside the concrete mixture 12 reinforces the cured concrete such that the reinforced concrete preferably has higher tensile strength than an unreinforced cured concrete.

Figure 5:
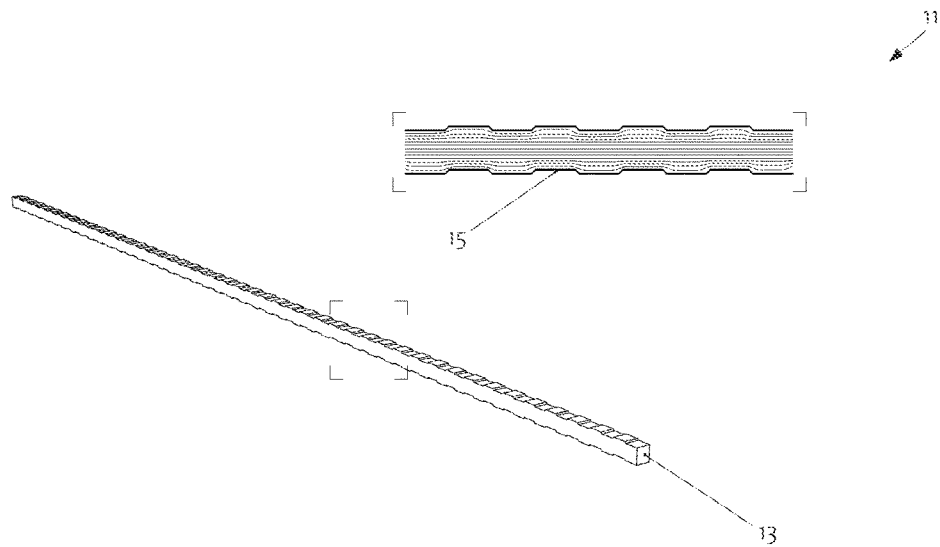
FIG. 5 illustrates a perspective view of a single reinforcement bamboo composite bar for the reinforced concrete element of FIG. 1, according to an example embodiment.

FIG. 5 shows one reinforcement bamboo composite bar 13 according to an example embodiment. The bamboo composite bar 13 includes a plurality of rectangular alternating impressions 15 in one or several of its surfaces to enhance its mechanical properties. The impressions 15 are also referred to as grooves.

These grooves 15 increase the frictional engagement of the reinforcement bamboo composite bar 13 with its surrounding material such as concrete. Other surrounding materials are possible. The grooves 15 are advantageously shaped to transmit possible forces in a structural adequate way to the surrounding material.

The impressions 15 of the bamboo composite bar 13 are preferably produced in such a way that the impressions 15 do not disturb or harm the bamboo fibers inside the bamboo composite bar 13, thereby allowing the bamboo composite bar 13 an undisturbed transmission of forces.

Different impression methods, forms, shapes, or systems to produce bamboo composite reinforcement components such as reinforcement bars are possible. This can be achieved through pressing into respective moulds or other types of cold or hot forming methods or through cutting, milling or other types of shaping. Preferably, the process helps to orient the fiber direction following the shape of the final product.

The described bamboo composite components such as the reinforcement bamboo composite bars 13 or the connectors 14 comprise bamboo composite material. The bamboo composite material in these examples includes treated and split bamboo slices or sheets, which are glued together with a binding agent (also referred to as glue or adhesive herein) under pressure and heat.

The bamboo composite material in the example embodiments uses raw bamboo canes as a resource material, which is widely spread in the tropical regions worldwide. The mechanical and physical properties of the raw bamboo material as used/fabricated in example embodiments advantageously allow to produce a lightweight composite material which has a high tensile strength, comparable to or even superior to construction steel. Preferably, the binding agent enables the bamboo composite material to be water resistant. The bamboo composite material is preferably hydrophobic.

Advantageously, the bamboo composite material does substantially not swell by taking any water from the concrete mixture surrounding it and therefore it does preferably not crack during the curing process in concrete applications. Furthermore, shrinking of the bamboo composite material can be substantially prevented. The added binding agent preferably provides a positive bonding of the bamboo composite material to the cured concrete mixture 12 and therefore increases the shear strength of the resulting reinforced concrete. The binding agent also preferably controls the elasticity and the temperature coefficient as well as the heat resistance of the bamboo composite material.

The pre-treatment of the bamboo slice or sheets used in the composite material together with the binding agent also substantially prevents damage that might be caused by insects, fungicides or any other biological attacks. This effect is important for maintaining the mechanical and physical properties of the bamboo composite material over its life span as a building component, in example embodiments.

Bamboo composite materials are commonly produced from older than 3-year old Bamboo culms. Different bamboo species and harvesting times are possible. In order to eliminate sugar molecules inside the bamboo fibers, while at the same time preferably making the bamboo culm or section more usable for techniques such as veneering or planing for separating the slices or sheets, it is possible to heat the bamboo culm or section, e.g. by boiling or simmering in a pot, in an example embodiment. Alternatively or additionally, the separated slices or sheet may be boiled, e.g. where other techniques for separation are being used. These bamboo slices or sheets can be dried in a drying chamber with controlled atmosphere to reduce the moisture content to less than about 18% and preferably less than about 10%. These steps of boiling and drying can be applied in varying intensity and duration, or skipped, to reach different material properties in the final bamboo composite material for structural applications.

In example embodiments, above about 60 degree Celsius temperature for at least about 6 hours may be used for the heat treatment for sugar removal and usability for e.g. veneering. However other temperatures/ranges may be used. Lower temperature, but longer times, e.g. about 60 degree Celsius for about 72 hours, may be preferred, as it is believed by the inventors to be less harmful for the cell structure and fiber strength.

The bamboo slices or sheets can be dried in an oven at about 60 to 80 degree Celsius (depending e.g. on the material properties) for about 14 hours, until a desired moisture content (preferably about 5-8%) is reached, in example embodiments.

It has been recognized by the inventors that higher temperatures, e.g. about 100 degree Celsius, may result in too much moisture evaporating, and the material becoming brittle. In a preferred embodiment, the air is exchanged substantially constantly to help carry away moisture from the bamboo slices or sheets, using e.g. a convection oven set-up.

The bamboo slices or sheets are combined with the resin, either by dipping them into a pool bath, by applying the resin externally with or without pressure or in vacuum.

The bamboo slices or sheets are then pressed at either hot or substantially at room temperature to produce the bamboo composite material, for example for use as reinforcement components 11. In one embodiment, a hot press is heated to a temperature of about 100 degree Celsius. The bamboo slices or sheets are then pressed for about 20 minutes with a pressure of about 20 MPa. Afterwards, the pressure is released and the product remains in the mould at about 100 degree Celsius for another about 20 minutes.

However, it is noted that each glue has its own curing times, temperature and time depending on the glue. The pressure also depends e.g. on the mould and the desired thickness of the final product. Activation of the glue is preferably achieved during the pressing process. Activation may be facilitated through heat in hot press processes, meaning that generally lower pressures may be required, e.g. about 20 MPa. On the other hand, for cold, e.g. room temperature pressing, activation may be facilitated through applying higher pressure, e.g. about 100 MPa.

The pressed bamboo composite reinforcement components 11 are placed in a curing chamber at about 45 degree Celsius to cool down and to dry for at least about 18 hours in an example embodiment. The bamboo composite reinforcement components 11 could possibly be coated afterwards with a special agent to enhance the mechanical and physical properties of the components 11. Herein, the agent could be different from the first one used in the glue bath described above.

The adhesive can comprise, but is not limited to, two different components. Preferably, the adhesive is a heat-reactive and cross-linkable system that can be adjusted due to its particular composition to the fibrous raw material in order to deliver the desired mechanical properties of the product. It can be a one- or several-stage system, which can be completely crosslinked in one or more subsequent steps. Crosslinking is preferably thermally activated.

Resulting is a functional connection between the individual fiber bundles with improved strength that is capable of transducing directive loads between the bamboo fiber bundles/fibers. In addition the adhesive preferably impregnates the bamboo fiber bundles/fibers in the presence of heat and pressure. The glue advantageously materially connects with differently pre-treated bamboo fiber bundles/fibers and bamboo fiber bundles/fibers of different bamboo species and origin. Correspondingly, the adhesive material composition is preferably selected depending on the raw material and the desired properties of the resulting product.

The adhesive can contain additives, such as dies, flame-retardants or melt flow enhancers. The adhesive can contain catalysts or particles to help mechanical interlocking or prevent shear failure of the composite.

The use of bamboo composite reinforcement bars 13 in a reinforced concrete element 10, reinforces the cured concrete element 10 and preferably provides an improved tensile and shear strength compared to a cured concrete element without any reinforcement. In other words, the bamboo composite reinforcement components 11 compensate for the relatively low tensile strength of concrete.

Figure 6:
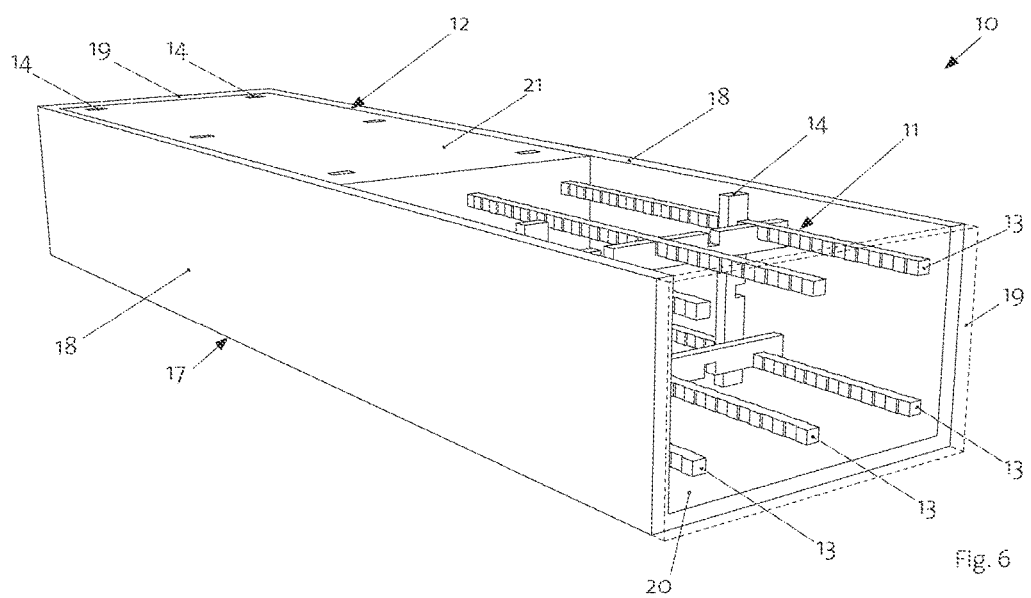
FIG. 6 illustrates a fabrication process of the reinforced concrete element of FIG. 1, according to an example embodiment.

FIG. 6 shows a method of producing the bamboo composite reinforced structural concrete element 10 shown in FIG. 2, according to an example embodiment. The method includes the step of placing the reinforcement bamboo composite bars 13 together with their corresponding bamboo composite connectors 14 into a mould container 17 comprising two long planks 18, two short planks 19, and a base plank 20. Here, the bamboo composite connectors 14 act as a spacing device for separating the reinforcement bamboo composite bars 13 from the mould container 17. After this, a molten concrete mixture 21 is poured into the mould container 17 for filling the mould container 17, wherein the molten concrete mixture 21 surrounds the bamboo composite reinforcement components 11.

The molten concrete mixture 21 is then left to cure, wherein the molten concrete mixture 21 to solidified to form the finished reinforced concrete element 10. The finished reinforced concrete element 10 is then removed from the mould container 17.

Different ways of arranging or combining bamboo composite reinforcement components 11 acting as a reinforcement system for reinforced concrete applications depending on their embodiment, form, and shape are possible. The application examples could also be combined with bamboo composite swarm-reinforcement components shown in FIGS. 13-20.

Figure 7:
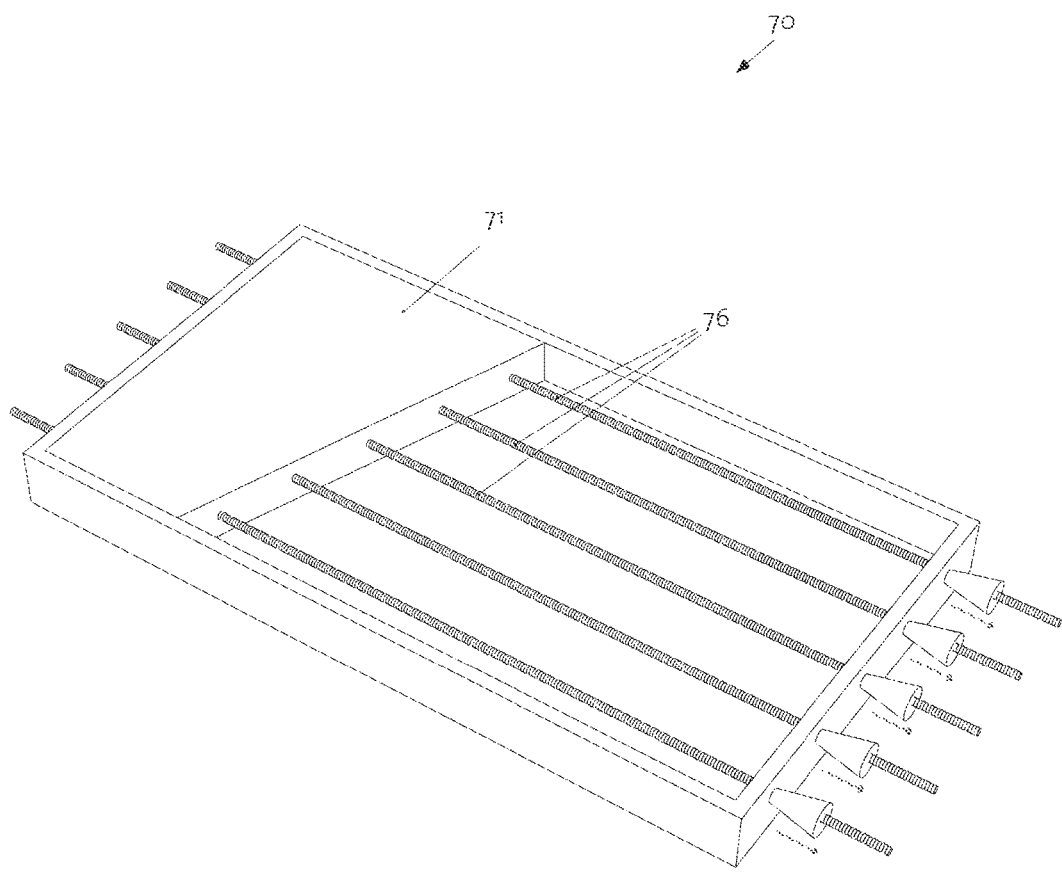
FIG. 7 illustrates a possible use of bamboo composite reinforcement rods in pre-stressed reinforced concrete elements, according to an example embodiment.

The composite material can also be used for pre-stressed concrete elements FIG. 7 shows an exemplary and simplified application of bamboo composite components for a pre-stressed reinforced concrete element produced in a moulding module 70, according to an example embodiment, illustrating reinforcement bamboo composite bars 76 for embedding in a concrete mixture 71.

Figure 8:
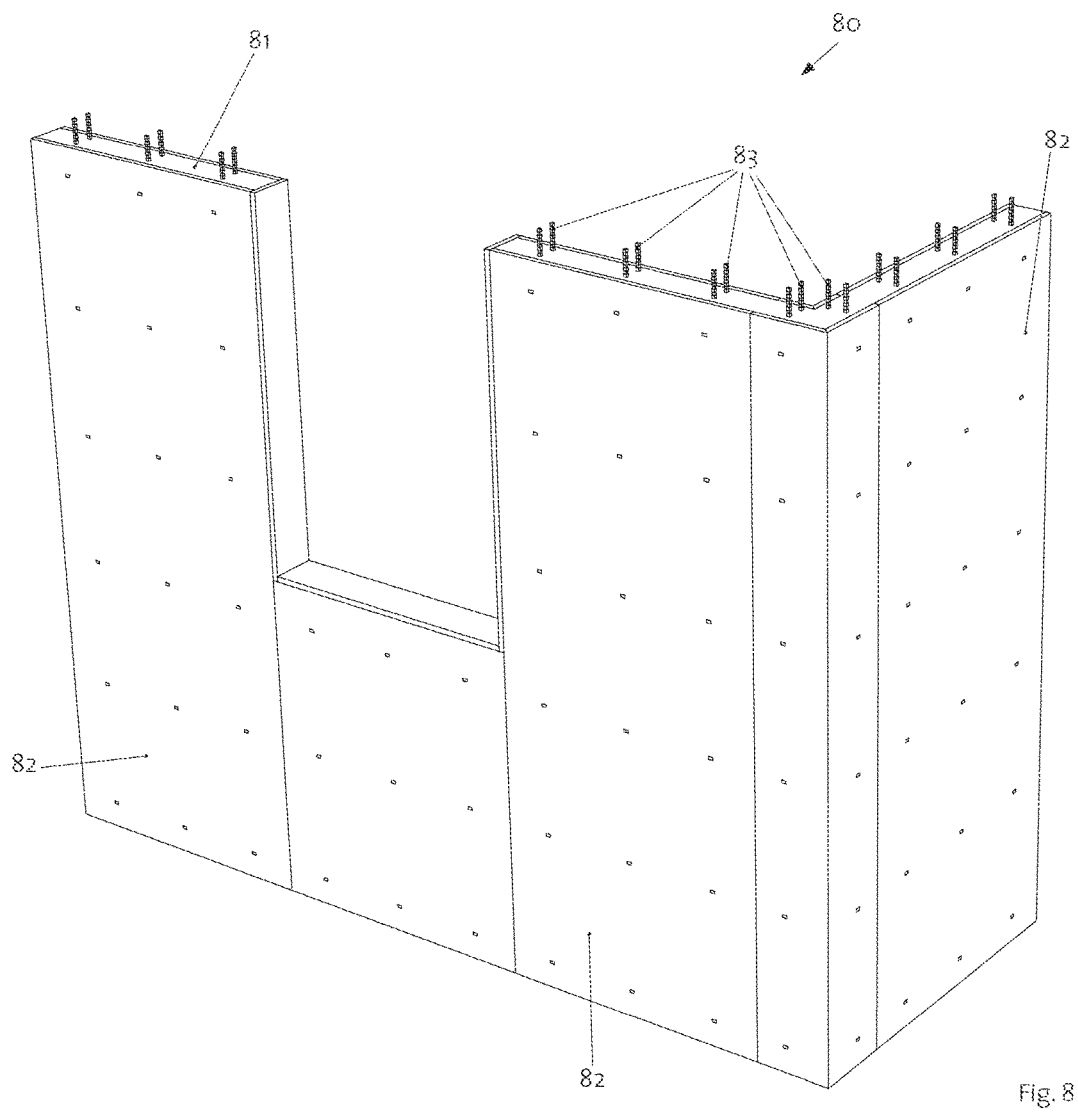
FIG. 8 illustrates a perspective view of a reinforced concrete wall element comprising lost formwork panels as well as reinforcement components, according to an example embodiment.
Figure 9:
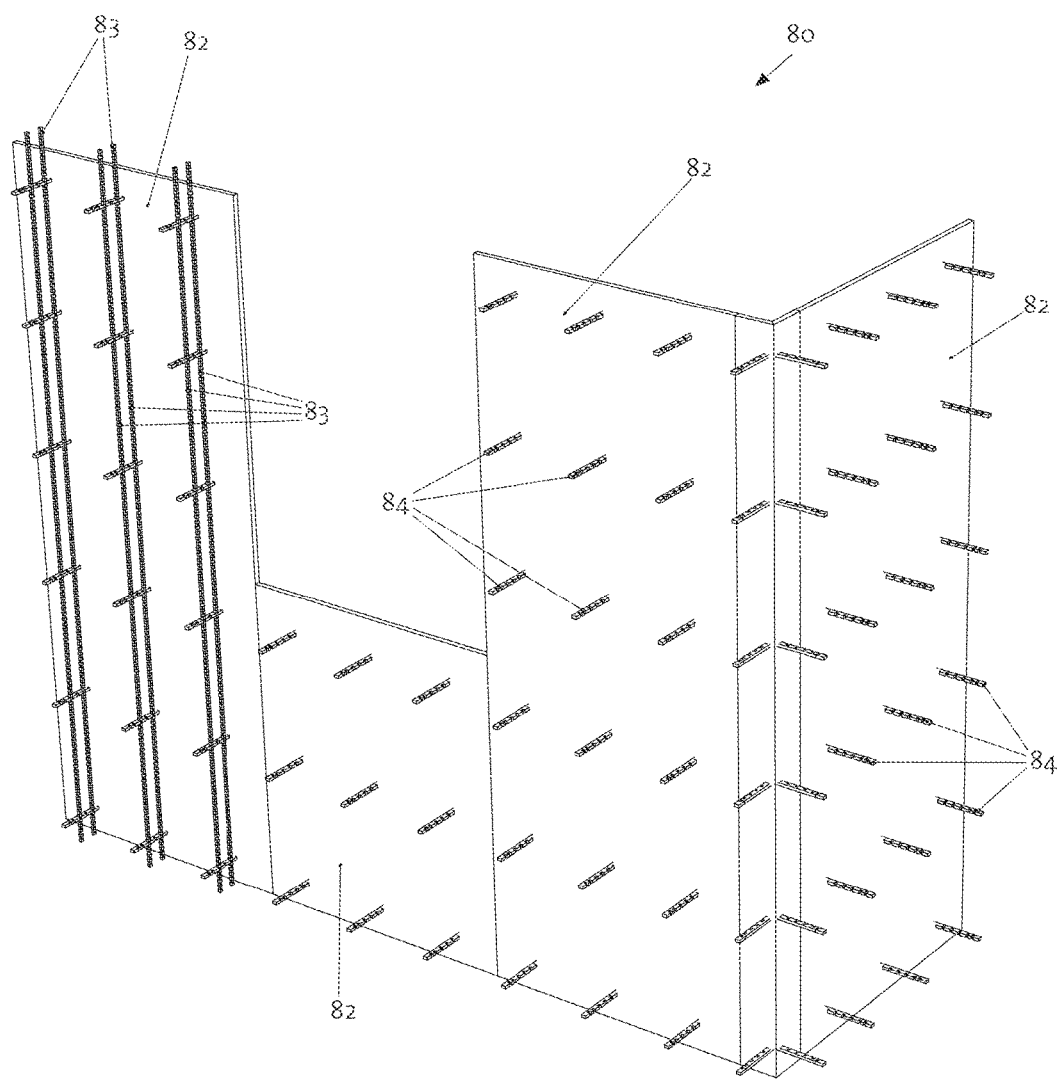
FIG. 9 illustrates a step of fabricating the reinforced concrete wall element as shown in FIG. 8, according to an example embodiment.
Figure 10:
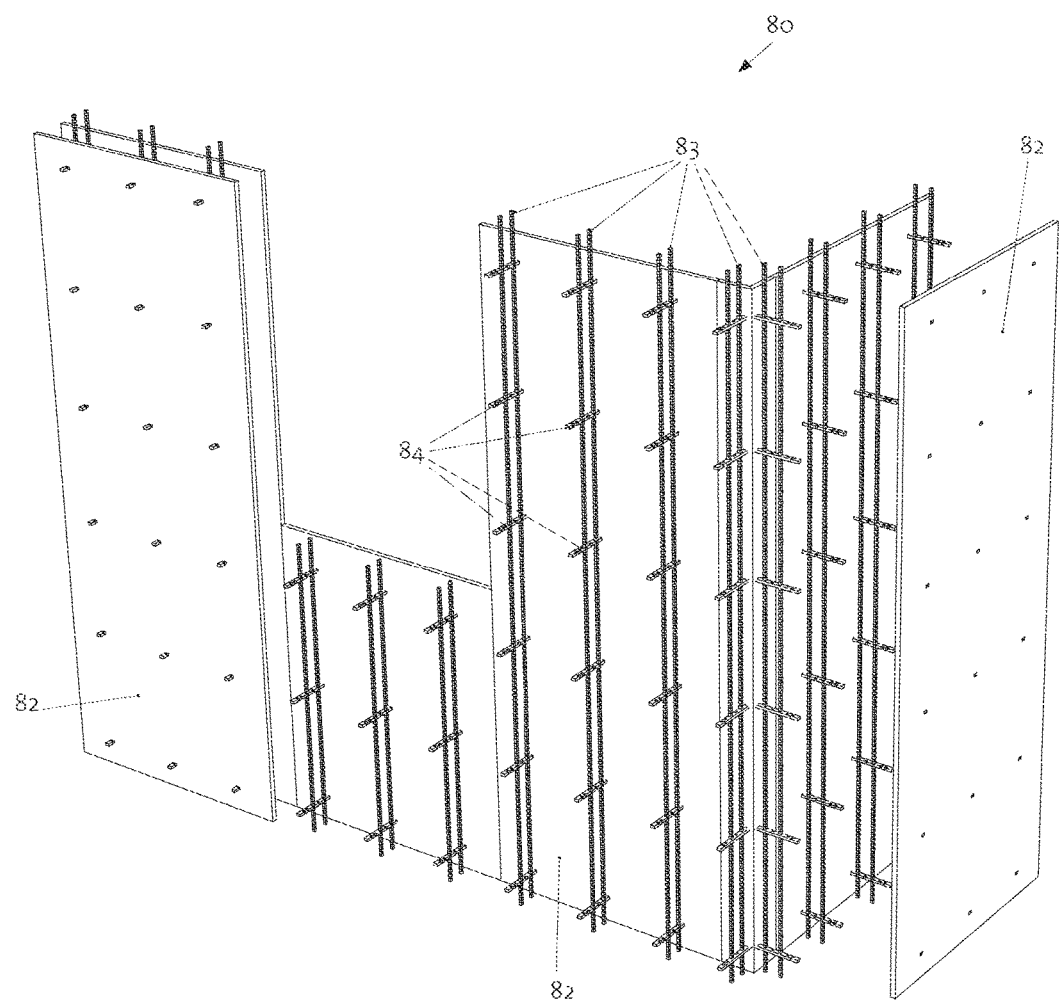
FIG. 10 illustrates another step of fabricating the reinforced concrete wall element as shown in FIG. 8, according to an example embodiment.

FIGS. 8 to 10 show a reinforced concrete wall element 80. The concrete wall element 80 comprises a lost formwork, a cured concrete mixture 81 as well as a plurality of reinforcement bamboo composite bars 83 and bamboo composite connectors 84.

Figure 12:
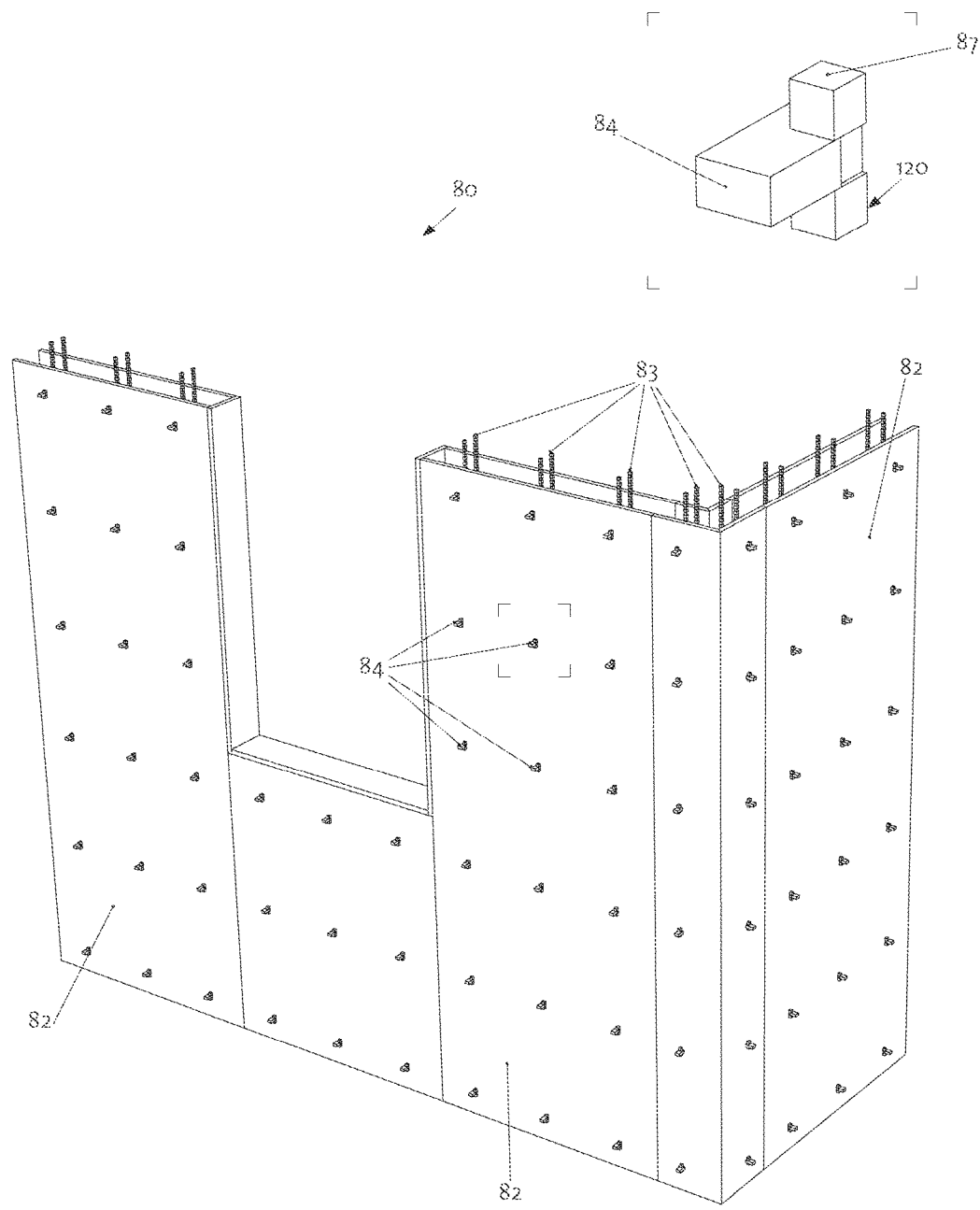
FIG. 12 illustrates another step of fabricating the reinforced concrete wall element as shown in FIG. 8, according to an example embodiment.

In particular, the reinforcement bamboo composite bars 83 are attached to the bamboo composite connectors 84. The lost formwork includes bamboo composite panels 82. As seen in FIG. 12, the bamboo composite connectors 84 are attached to the bamboo composite panels 82 by connection systems 120. Each connection system 120 includes a locking device 87 for attaching to one end of the bamboo composite connector 84.

In use, the lost formwork is used for holding wet concrete until it sets.

The bamboo composite connectors 84 act as spacers for separating the reinforcement bamboo composite bars 83 while the reinforcement bamboo composite bars 83 reinforce the cured concrete mixture 81.

The molten concrete mixture 81 is for pouring into the formwork and for enclosing the reinforcement bamboo composite bars 83 and the bamboo composite connectors 84. In addition, the molten concrete mixture can include other bamboo composite components in order to a) reduce the amount of concrete mixture 81, b) reduce the weight of the concrete mixture 81, and c) enhance the structural capacity of the element 80.

A method of producing the bamboo composite reinforced structural concrete wall element 80 according to an example embodiment is provided below.

The method includes a step of placing a first set of the bamboo composite panels 82 next to each other to form one side of the lost formwork, as illustrated in FIG. 9. Holes are then drilled on the first set of the bamboo composite panels 82. After this, first ends of the bamboo composite connectors 84 are inserted and are attached to these holes with the locking device 87.

Figure 11:
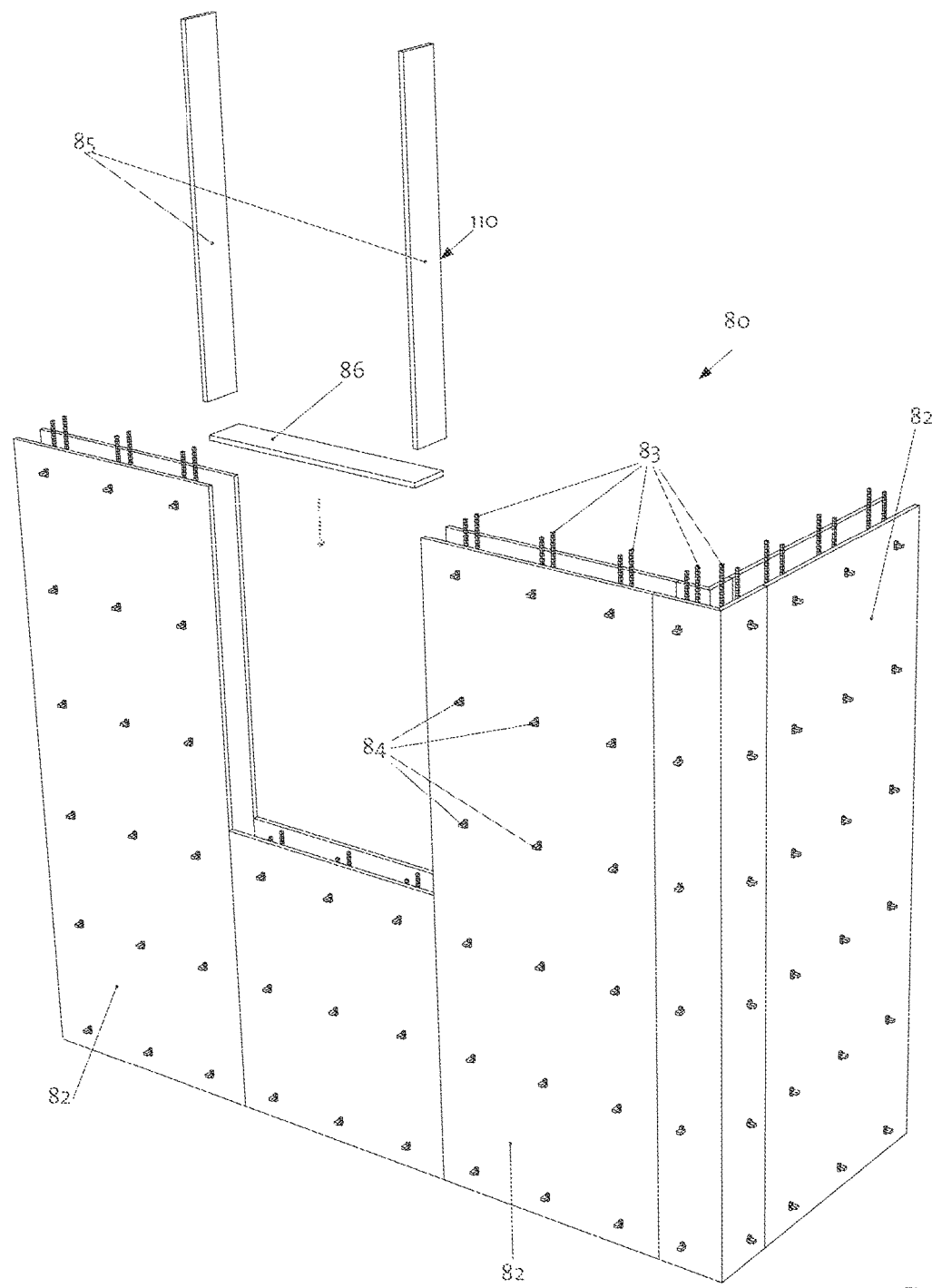
FIG. 11 illustrates a further step of fabricating the reinforced concrete wall element as shown in FIG. 8, according to an example embodiment.

The reinforcement bamboo composite bars 83 are later attached to the bamboo composite connectors 84. After this, a second set of the bamboo composite panels 82 are placed opposite to the first set of bamboo panels 82 to form a second side of the lost formwork, as illustrated in FIGS. 10, 11, and 12. The placement is done such that second ends of the bamboo composite connectors 84 are inserted in and attached to holes of the second set of bamboo panels 82 with the corresponding locking device 87.

The molten concrete mixture 81 is later poured into the space between the two bamboo composite panels 82. The molten concrete mixture 81 covers all bamboo composite components, namely the reinforcement bamboo composite bars 83 and the bamboo composite connectors 84, for acting as a reinforcement system in the structural concrete wall.

The molten concrete mixture 81 is then left to dry and solidify, wherein the solidified concrete mixture 81 forms the concrete wall element 80.

FIG. 11 shows a possible set up for inserting a window opening 110 in the bamboo composite reinforced structural concrete wall element 80. Two vertical boards 85 and one horizontal board 86 are used to close an opening of the bamboo composite panels 82 of the formwork for concrete pouring.

FIG. 12 shows a possible method to connect the bamboo composite connectors 84 to the bamboo composite lost formwork panels 82.

The lost formwork panels 82 can have a benefit as they provide a lightweight building system while delivering a ready to use surface for the building sector. The surface is preferably water resistant as well as unaffected by insect or fungicide attacks. The surface also advantageously allows connecting easily to other non-bearing building elements such as division walls, shading elements, or infrastructural devices such as pipes or cables. It also preferably allows easy installations of windows and doors by just fixing them by screws into the desired openings.

In a general sense, the reinforcement bamboo composite bars serve as a linear bamboo composite component.

Different methods combining different components of bamboo composite reinforcement components and their combinations are possible. The application example shown could also be combined with bamboo composite swarm-reinforcement components shown in FIGS. 13-20. Different shapes, sizes, and connection methods of the bamboo composite panels 82 are possible, allowing also for precast processes, whereby pre-manufactured wall pieces are placed together on site. The bamboo composite reinforcement components can also adapt for use as other building elements such as beams, ceiling panels, and lintels.

Figure 13:
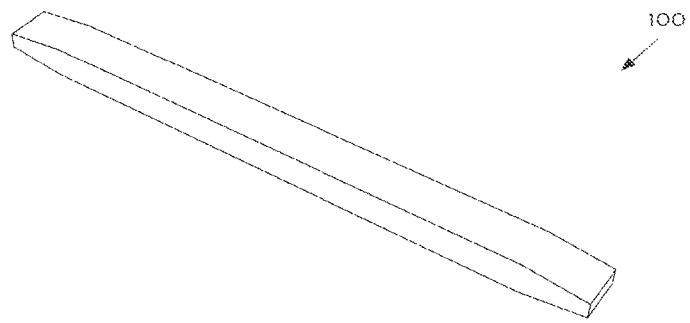
FIG. 13 illustrates a straight bamboo composite component without grooves or impressions for a swarm reinforcement system in structural concrete applications, according to an example embodiment.
Figure 14:
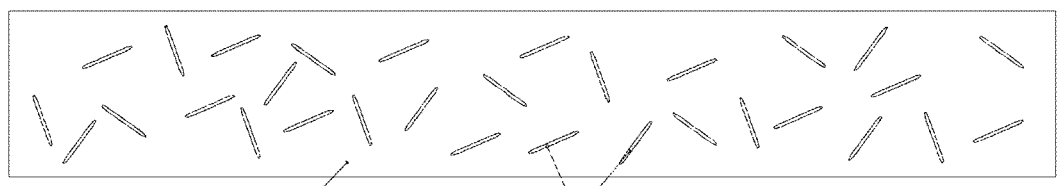
FIG. 14 illustrates a reinforced concrete application with a swarm reinforcement system comprising the straight bamboo composite components of FIG. 13, according to an example embodiment

FIG. 13 shows a bamboo composite swarm reinforcement component 130 according to an example embodiment without grooves for swarm reinforcement systems in structural concrete members. FIG. 14 shows a side cross section of such an exemplary structural concrete member 140 with swarm reinforcement. This structural concrete member 140 includes a plurality of the bamboo composite swarm reinforcement components 130 within a concrete mixture 141.

The bamboo composite swarm reinforcement components 130 have the shape of a needle with a length of about 20 mm (millimeter) to 200 mm and a thickness of about 1 mm to about 20 mm, whereas other dimensions are also possible. The surface of the swarm reinforcement components 130 in this embodiment has no grooves.

In a general sense, different types of glue as well as different bamboo species can be used to produce the bamboo composite reinforcement components 130. Various moulding techniques and methods can be used to produce bamboo composite swarm reinforcement components 130 in different shapes, diameters, length, form, and surface textures, etc. Examples of such variations are shown in FIGS. 15-20.

The bond between the concrete mixture 141 and the bamboo composite swarm reinforcement components 130 is preferably achieved by the mechanical roughness between surfaces of the concrete mixture 141 and the swarm reinforcement components 130. The said bond can also be achieved by possible chemical connection between the concrete mixture 141 and the swarm reinforcement components 130 according to their properties.

The substantially random aligning of the plurality of bamboo composite swarm reinforcement components 130 in all directions improves the physical properties and the load bearing behaviour of structural members against tension, bending, and shear stresses. In other embodiments, other arrangements than substantially random aligning may be used to obtain desired properties, for example aligning along one or more directions.

The bamboo composite swarm reinforcement components 130 are preferably lightweight and strong due to the properties of its raw material bamboo and in conjunction with the glue. Also in combination with the glue substance, they are preferably also water proof and resistant to insects and fungus.

FIGS. 15-20 show different embodiments of bamboo composite swarm reinforcement components for swarm reinforcement systems in structural concrete members.

Figure 15:
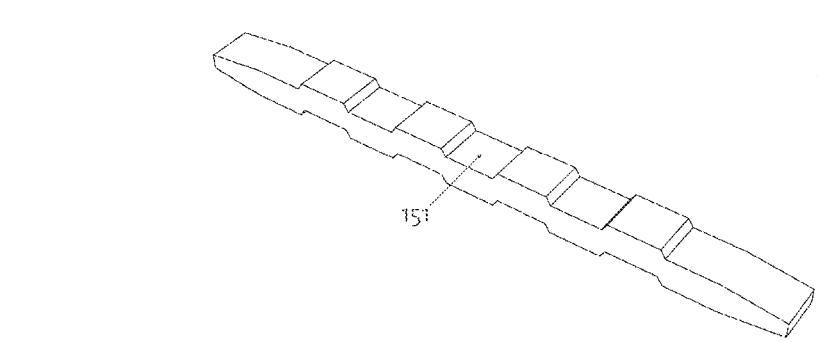
FIG. 15 illustrates a straight bamboo composite component with impressed grooves for a swarm reinforcement system in structural concrete applications, according to an example embodiment.
Figure 16:
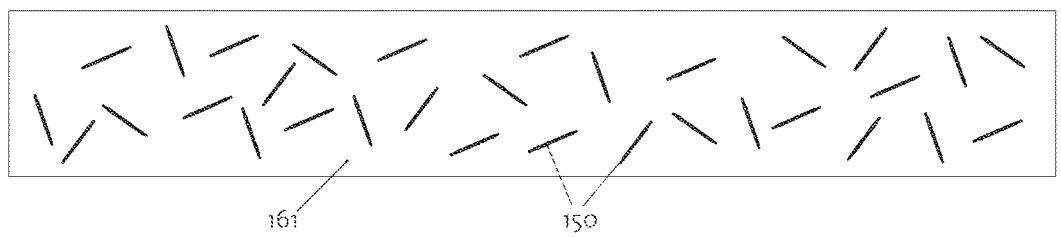
FIG. 16 illustrates a reinforced concrete application with a swarm reinforcement system comprising the straight bamboo composite components of FIG. 15, according to an example embodiment

FIG. 15 shows a bamboo composite swarm reinforcement component 150 with the shape of a needle with a length of about 20 mm to about 200 mm and a thickness of about 1 mm to about 20 mm, although other dimensions are also possible. Its surface has impressed grooves 151. FIG. 16 shows an exemplary bamboo composite swarm-reinforcement structural concrete member 160 with a plurality of bamboo composite swarm reinforcement components 150 within a concrete mixture 161.

The bond between the concrete mixture 161 and the bamboo composite swarm reinforcement components 150 is achieved by the mechanical roughness of their surfaces and possible chemical connection of their two materials according to their properties. The impressed grooves 151 further increase the mechanical friction between the bamboo composite swarm-reinforcement component 150 and the concrete mixture 161 and can vary in shape and size to provide a best possible transmission of forces between their two different materials.

Figure 17:
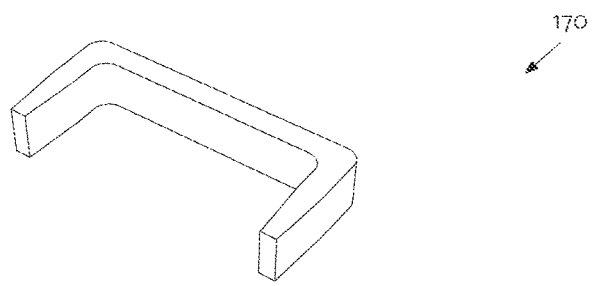
FIG. 17 illustrates a U-shaped bamboo composite component with smooth surface structure for a swarm reinforcement system in structural applications, according to an example embodiment.
Figure 18:
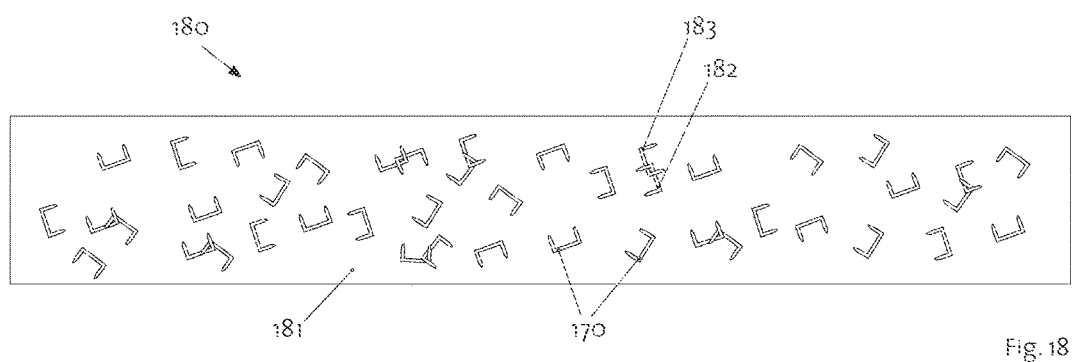
FIG. 18 illustrates a reinforced concrete application with a swarm reinforcement system comprising the U-shaped bamboo composite components of FIG. 17, according to an example embodiment

FIG. 17 shows a bamboo composite swarm reinforcement component 170 with a U-shape having a length of about 20 mm to about 200 mm, a width of 10 mm to 150 mm and a thickness of 1 mm to 20 mm, although other dimensions are also possible. FIG. 18 shows an exemplary structural concrete member 180 with a plurality of the bamboo composite swarm reinforcement components 170 within a concrete mixture 181.

The bond between the concrete mixture 181 and the bamboo composite swarm reinforcement components 170 is achieved by the mechanical roughness of their surfaces and possible chemical connection of their two materials according to their properties. Additionally, the U-shaped of the elements 170 entangle themselves with each other, forming connected reinforcement systems in the concrete mixture 181. The upper bamboo composite swarm reinforcement component 183 connects itself with the lower bamboo composite swarm reinforcement component 182 in the mixing or pouring process of the concrete mixture 181. After the concrete mixture 181 is dried, the upper and lower bamboo composite swarm reinforcement components 182 and 183 act together as a connected structural element in the concrete mixture 181, further improving the structural properties of the concrete member 180.

Figure 19:
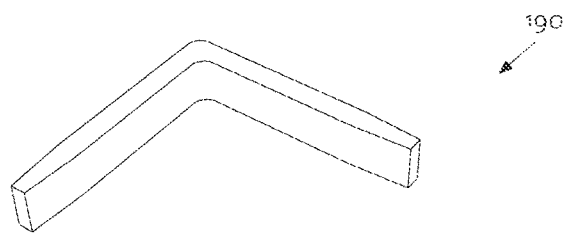
FIG. 19 illustrates an L-shaped bamboo composite component with smooth surface structure for a swarm reinforcement system in structural applications, according to an example embodiment.
Figure 20:
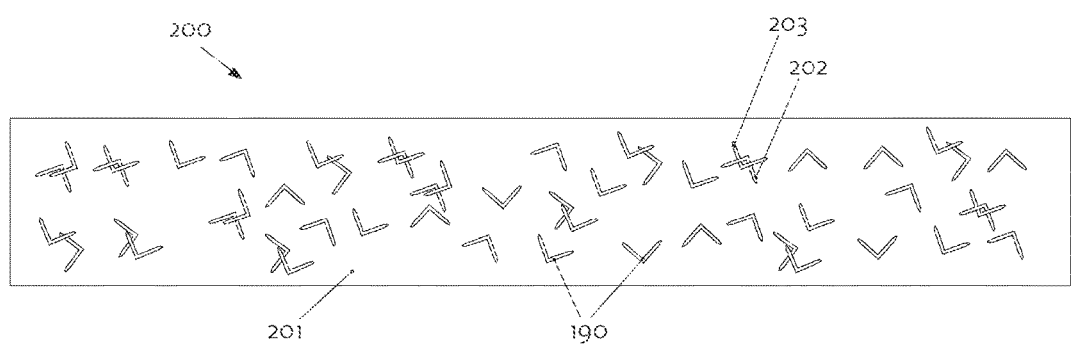
FIG. 20 illustrates a reinforced concrete application with a swarm reinforcement system comprising the L-shaped bamboo composite components of FIG. 19 in structural applications, according to an example embodiment.

FIG. 19 shows a bamboo composite swarm reinforcement component 190 having a L-shape with a length of 10 mm to 200 mm, a width of about 10 mm to about 200 mm and a thickness of about 1 mm to about 20 mm, although other dimensions are also possible. FIG. 20 shows an exemplary structural concrete member 200 with a plurality of bamboo composite swarm reinforcement components 190 within a concrete mixture 201.

The bond between concrete mixture 201 and the bamboo composite swarm reinforcement components 190 can be achieved by the mechanical roughness of their surfaces and possible chemical connection of their two materials according to their properties. Additionally, the bamboo composite swarm reinforcement components 190 have an L-shape, which causes the said elements 190 to entangle themselves with each other, forming connected reinforcement systems in the concrete. The upper bamboo composite swarm reinforcement component 203 connects itself with the lower bamboo composite swarm reinforcement component 202 in the mixing or pouring process of the concrete mixture 201. After the concrete mixture 201 is dried, the upper and lower bamboo composite swarm reinforcement components 202 and 203 act together as a connected structural element in the concrete mixture 201, further improving the structural properties of the concrete member 200.

Figure 21:
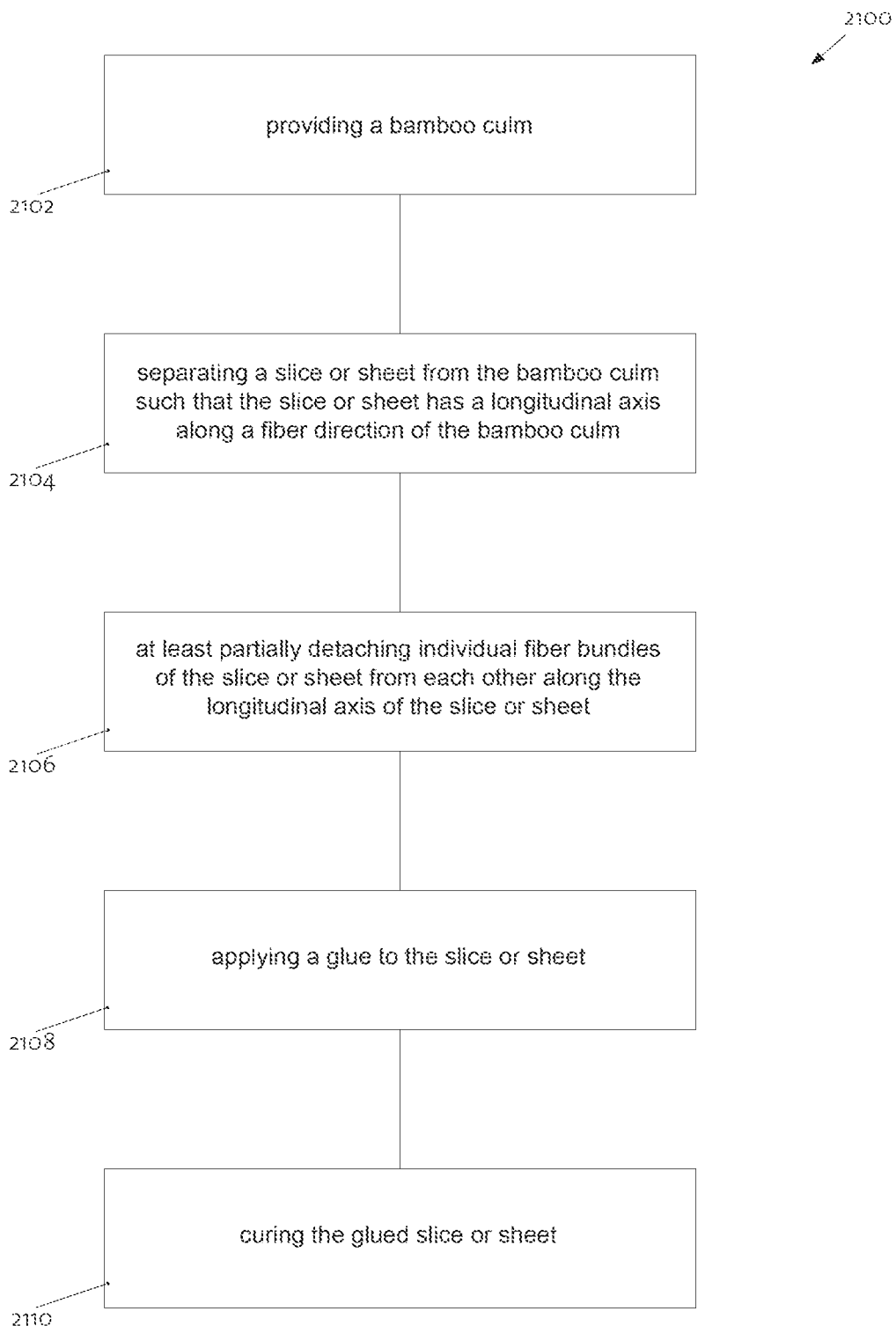
FIG. 21 shows a flowchart illustrating a method of fabricating a composite material for structural applications, according to an example embodiment.

FIG. 21 shows a flow chart 2100 illustrating a method of fabricating a composite material for structural applications. At step 2102, a bamboo culm is provided. At step 2104, a slice or sheet is separated from the bamboo culm such that the slice or sheet has a longitudinal axis along a fiber direction of the bamboo culm. At step 2106, a individual fiber bundles of the slice or sheet are at least partially detached from each other along the longitudinal axis of the slice or sheet. At step 2108, a glue is applied to the slice or sheet. At step 2110, the glued slice or sheet is cured.

Resulting is a functional connection between the individual fiber bundles with improved strength that is capable of transducing directive loads between the bamboo fiber bundles/fibers. In addition the glue preferably impregnates the bamboo fiber bundles/fibers in the presence of heat and pressure, or substantially only pressure in case of a cold pressing process, facilitated by the individual fiber bundles being at least partially un-attached to each other along a length of the slice or sheet. The glue advantageously materially connects with differently pre-treated bamboo fiber bundles/fibers and bamboo fiber bundles/fibers of different bamboo species and origin. Correspondingly, the glue's material composition is preferably selected depending on the raw material and the desired properties of the resulting product.

In one embodiment, a composite material for structural applications is provided comprising a slice or sheet of bamboo fiber bundles; and a cured glue applied to the slice or sheet; wherein the cured glue fills a gap between at least partially un-attached adjacent fiber bundles of the slice or sheet along a length of the slice or sheet. The composite material preferably comprises a plurality of slices or sheets, and the glue applied to the plurality of slices or sheets.

Figure 22:
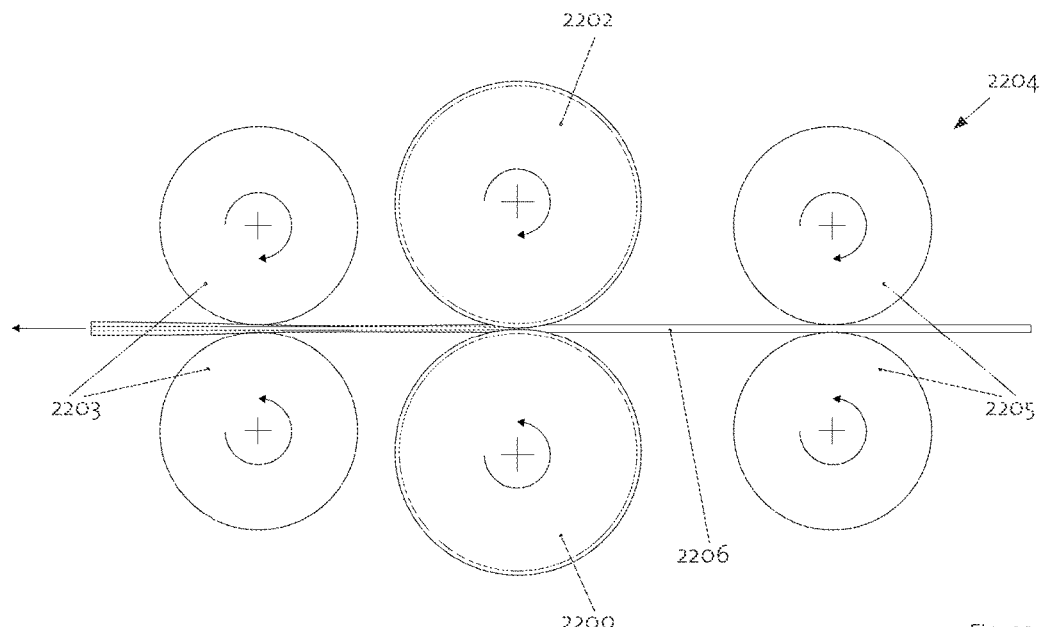
FIG. 22 illustrates a roller press for squeezing the slice or sheet, according to an example embodiment.

In one embodiment, the detaching comprises feeding the slice or sheet into a roller press. FIG. 22 shows a schematic diagram illustrating a roller press machine 2204 according to an example embodiment. A pair of ridged rollers, 2200, 2202 are disposed between two pairs 2203, 2205 of conveyer rollers. Ridges of the opposing ridged roller 2200, 2202 are disposed such that they are aligned with grooves of the other ridged roller 2200, 2202 to thereby create a squeezing action upon the slice or sheet 2206 upon passing therebetween. The dimensions, shapes, distances and load of the ridged rollers 2200, 2202 are preferably chosen such that fiber bundles of the slice or sheet 2206 are at least partially un-attached to each other along a length of the slice or sheet upon passing therebetween. Preferably, the fiber bundles remain at least partially attached to each other along the length of the slice or sheet, to facilitate orientation/alignment of the fiber bundles along their fiber direction, for improved/optimized strength of the composite material upon curing.

Figure 23:
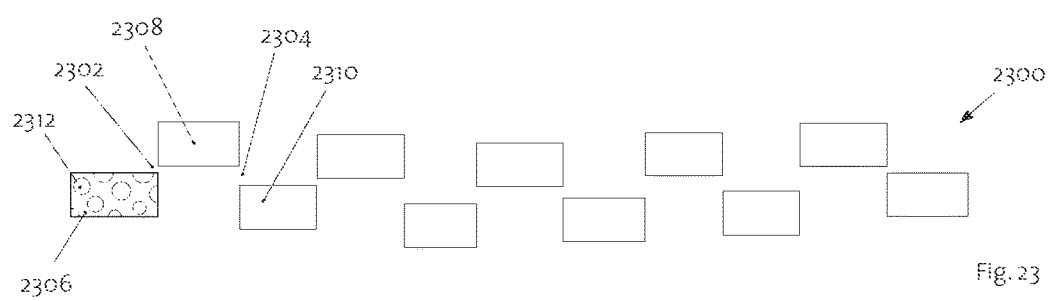
FIG. 23 is schematic drawing illustrating a cross-sectional view of a bamboo slice or sheet, according to an example embodiment.

FIG. 23 shows a schematic cross-section of the slice or sheet 2300 after the squeezing process, illustrating gaps e.g. 2302, 2304 between adjacent fiber bundles e.g. 2306 and 2308, and 2308 and 2310. Also illustrated in FIG. 23 are fibers e.g. 2312 within one of the fiber bundles 2306. For simplicity, fibers have not been illustrated for the other fiber bundles, which are, however, similarly constituted as will be appreciated by a person skilled in the art.

Figure 24:
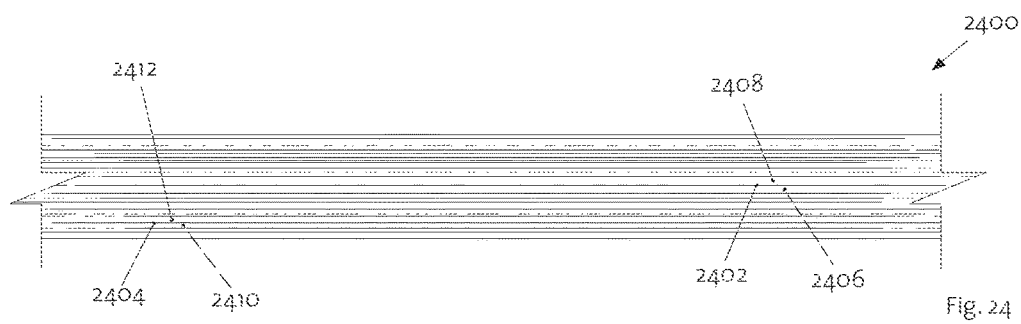
FIG. 24 is schematic drawing illustrating a top view of a bamboo slice or sheet, according to an example embodiment.

FIG. 24 shows a schematic top view of a slice or sheet 2400 after the squeezing process, illustrating gaps e.g. 2402, 2404 between adjacent fiber bundles e.g. 2406 and 2408, and 2410 and 2412, along the length of the slice or sheet 2400. As can be seen in FIG. 24, the fiber bundles are only partially un-attached to each other along the length of the slice or sheet 2400 in this embodiment. This can preferably facilitate alignment of the fiber bundles/fibers during the later processing, which in turn can advantageously result in improved strength of the composite material for structural applications. The slice or sheet can have different dimensions in different embodiments, for example the length may be from about 0.5 m to about 2.0 m, the width may be from about 1.0 cm to about 15.0 cm, and the thickness may be less than about 2 mm, preferably between 0.3 mm and 1.5 mm, and more preferably below 1 mm.

Having a thickness of the slice or sheet of less than about 2 mm also facilitates the creation of breaks along the fiber directions such that the fiber bundles are at least partially un-attached to each other along a length of the slice or sheet. The thickness of the slice or sheet is more preferably in a range from about 0.3 mm to 1.5 mm, and more preferably less than 1 mm.

In one embodiment, the glue is chosen such that a tensile strength of the cured slice or sheet substantially matches that of a first material.

In one embodiment, the glue is chosen such that a thermal expansion coefficient of the cured slice or sheet substantially matches that of a second material.

The first and second materials may be the same material or may be different materials.

The second material may be a further component of the composite material.

The composite material may comprise reinforced concrete.

The second material may comprise one or more of a group consisting of concrete and steel.

To allow for the control and tuning of the thermal expansion towards the specific materials, apart from the specific choice of a resin and a hardener, the glue's composition may comprise one or more specific fillers in variable resin-filler ratios.

In one embodiment, the first material comprises one or more of a group consisting of steel, carbon and glass, and bamboo, hemp, sisal or other organic high-tensile fibers.

The glue may comprise one or more components, i.e. a combination of at least but not limited to one resin and at least but not limited to one hardener component to target the tensile strength of the specific materials. The resins may be a cold blend of various resin families, e.g. polyethylene (PE), vinyl ester (VE), polyurethane (PU) or epoxy.

In one embodiment, the slice or sheet is not subjected to carbonization prior to application of the glue.

In one embodiment, the slice or sheet is not subjected to steaming between the separation of the slice or sheet from the bamboo culm and the application of the glue.

Figure 25:
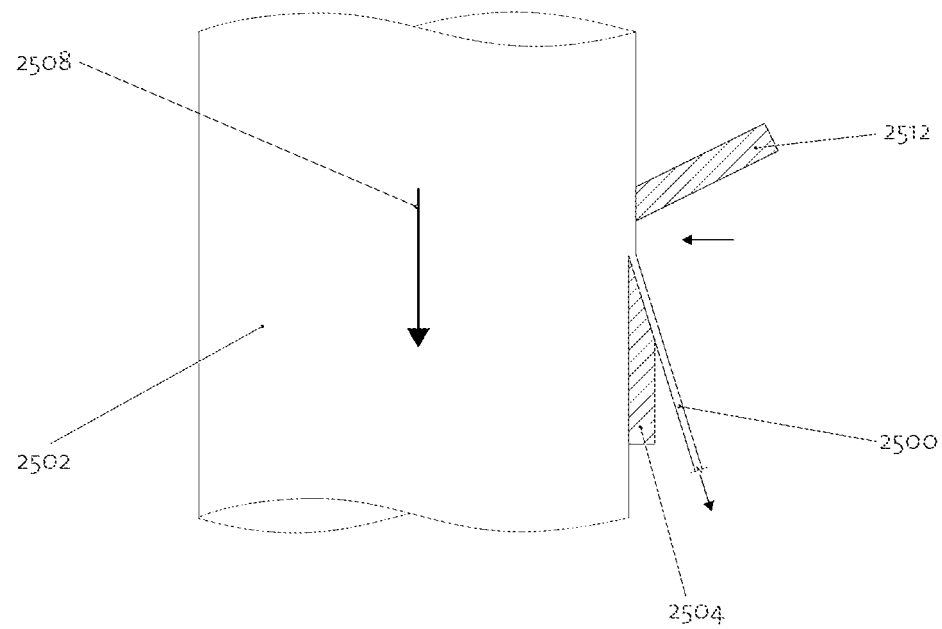
FIG. 25 is schematic drawing illustrating a planing machine for use in a veneering technique, according to an example embodiment.

FIG. 25 shows a schematic drawing illustrating a planing machine/technique for separating a slice or sheet 2500 from a bamboo culm or section 2502. A wedge 2504 is disposed about parallel to the fiber direction and a linear relative rotational movement between the wedge 2504 and the bamboo culm or section 2502 is effected, here by moving the bamboo culm or section 2502 as indicated at numeral 2508. A spacer 2512 is placed or pressed onto the bamboo culm or section 2502, to adjust a thickness of the separated slice or sheet 2500. The inventors have found that the application pressure of the spacer 2512 can influence, and preferably facilitate, properties of the separated slice or sheet 2500 for the fabrication of the composite material for structural applications. The right amount of pressure preferably allows for thinner slices, which are favorable for the properties of the composite material for structural applications.

In one embodiment, the separating comprises splitting using a wedge disposed at about 90° to the fiber direction and applying a relative rotational movement around an axis parallel to the fiber direction between the wedge and the bamboo culm. This may be referred to application of a veneering or planing technique.

Figure 26:
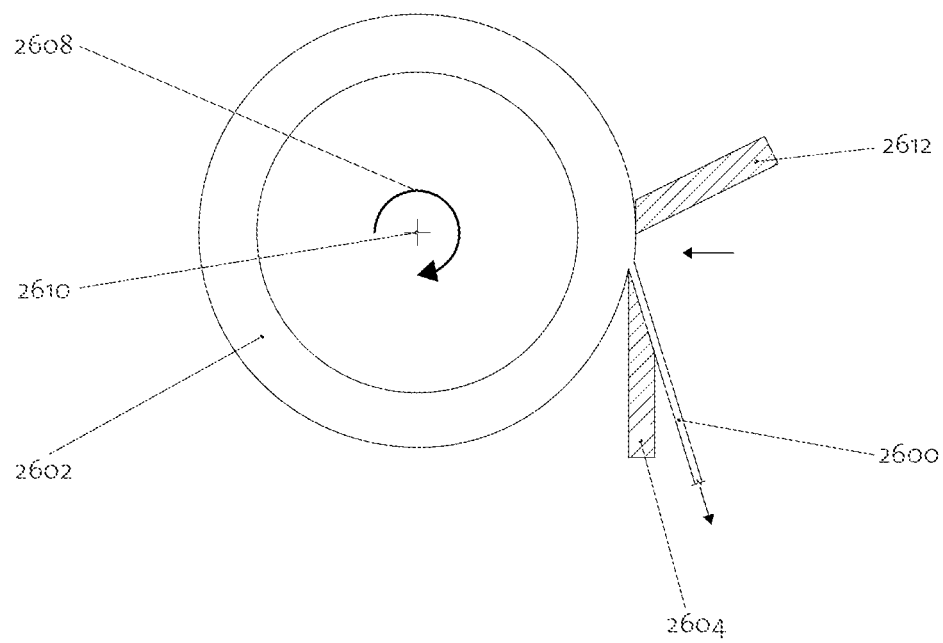
FIG. 26 is schematic drawing illustrates a veneering machine for use in a veneering technique, according to an example embodiment.

FIG. 26 shows a schematic drawings illustrating a veenering machine/technique for separating a slice or sheet 2600 from a bamboo culm or section 2602. A wedge 2604 is disposed at about 90° to the fiber direction and a relative rotational movement between the wedge 2604 and the bamboo culm or section 2602 is effected, here by rotating the bamboo culm or section 2602 as indicated at numeral 2608, around an axis 2610 parallel to the fiber direction. A spacer 2612 is placed or pressed onto the bamboo culm or section 2602, to adjust a thickness of the separated slice or sheet 2600. The inventors have also found that the application pressure of the spacer 2612 can influence, and preferably facilitate, properties of the separated slice or sheet 2600 for the fabrication of the composite material for structural applications. The right amount of pressure preferably allows for thinner slices, which are favorable for the properties of the composite material for structural applications.

In another embodiment, the separating process comprises splitting the bamboo culm into two or more splits, delaminating one split to form strips, and slicing the strip to form two or more slices.

In one embodiment, the applying of the glue comprises using a pressure based application process. The pressure-based process may comprise vacuum infusion.

The glue may be applied to a plurality of slices or sheets, and the plurality of glued slices or sheets are cured together to form a multi-sheeted composite material for the structural applications.

The glue may be applied individually to each of the plurality of slices or sheets.

The plurality of glued slices or sheets are cold or hot pressed together.

In one embodiment, the method further comprises a pre-treatment step for the bamboo culm to facilitate separating the slice or sheet from the bamboo culm. The pre-treatment step may comprise boiling the bamboo culm.

In one embodiment, the bamboo culm is cut into two or more sections along the fiber direction prior to and the slice or sheet is separated from one of the sections.

The bamboo composite materials may be produced from older than 3-year old Bamboo culms. Different bamboo species and harvesting times are possible. In order to eliminate sugar molecules inside the bamboo fibers, it is possible to heat the bamboo slices or sheets, e.g. by boiling or simmering the bamboo slices or sheets in a pot. These bamboo slices or sheets can be dried in a drying chamber with controlled atmosphere to reduce the moisture content to less than about 18% and preferably less than about 10%. These steps of boiling, carbonisation, and drying can be applied in varying intensity and duration, or skipped, to reach different material properties in the final bamboo composite material for structural applications.

The bamboo slices or sheets are combined with the glue, also referred to as binding agent or resin herein, either by dipping them into a pool bath, by applying the glue externally with or without pressure or in vacuum. The glued bamboo slices or sheets can afterward be placed in a chamber for drying the glue.

The bamboo slices or sheets are then pressed at either hot or room temperature to produce the bamboo composite material, for example for use as reinforcement components 11. The pressed bamboo composite reinforcement components 11 are placed in a curing chamber to cool down and to dry for at least 24 hours in an example embodiment. The bamboo composite reinforcement components 11 can be coated afterwards with a special agent to enhance the mechanical and physical properties of the components 11. Herein, the agent could be different from the first one used in the glue bath described above.

The glue can comprise, but is not limited to, two different components. Preferably, the glue is a heat-reactive and cross-linkable system that can be adjusted due to its particular composition to the fibrous raw material in order to deliver the desired mechanical properties of the product. It can be a one- or several-stage system, which can be completely crosslinked in one or more subsequent steps. Cross-linking is preferably thermally activated.

The glue can contain additives, such as dies, flame-retardants or melt flow enhancers. The glue can contain catalysts or particles to help mechanical interlocking or prevent shear failure of the composite.

Beside the inherent high mechanical strength of the bamboo composite, the binding agent serves to increase advantageously this mechanical strength of the bamboo composite elongated body. The bamboo composite also has lightweight, which allows for easy handling of the bamboo composite elongated body.

In practise, an external binding agent usually coats an external surface of the bamboo composite elongated body. The coating binds external parts of the elongated body together while also providing a sheet of protection for these external parts.

Similarly, inner parts of the bamboo composite elongated body, such as the slices or sheets or fibers bundles/fibers, can comprise an inner binding agent. The inner binding agent permeates or coats these inner parts to hold these inner parts together for increasing their mechanical strength. Catalysts improve the binding qualities in both cases and increase friction properties between composite elements.

External and internal binding agent can be the same but do not have to be the same.

In general, the binding agent can include different substances for providing different properties to the bamboo composite elongated body.

The binding agent can include a water-soluble substance, which enables the binding agent to permeate easily the inner parts of the bamboo composite elongated body. This allows the inner parts to be bound together for increasing their mechanical strength. It also includes the possibility of being applied in an environment of negative pressure (vacuum) in order to have better permeation.

Radiation could also be used as a binding agent. The inner parts could be bound together or inter-linked by changing the cell structure of the bamboo fibers by exposing the fibers to radiation as for example UV light or others. This includes the term bamboo "welding".

The binding agent can also include a water-resistant substance. The water-resistant substance prevents the bamboo composite elongated body from swelling due to absorption of water.

Advantageously, the elongated body can be constructed such that a binding agent being provided in the inner parts is water-soluble while a binding agent coating the external surface of the elongated body is water-resistant. Similar, different catalysts could be used in different parts of the composite material to influence the binding mechanisms.

The binding agent can also comprise an insect-resistant substance. In effect, this substance protects the elongated body against insect biting, which could gradually damage or erode the elongated body.

The binding agent can also include an antimicrobial substance. The antimicrobial substance kills or inhibits the growth of microorganisms, such as bacteria, fungi, or protozoans. The protozoans refer to very small living things, wherein each living thing has only one cell. This substance protects the elongated body against damage from these microorganisms.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive. Also, the invention includes any combination of features, in particular any combination of features in the patent claims, even if the feature or combination of features is not explicitly specified in the patent claims or the present embodiments.

The invention claimed is:

1. A method of fabricating a composite material for structural applications, the method comprising the steps of:
providing a bamboo culm;
separating a sheet from the bamboo culm such that the sheet has a longitudinal axis along a fiber direction of the bamboo culm;
at least partially detaching individual fiber bundles of the sheet form each other along the longitudinal axis of the sheet such that one or more gaps between adjacent fibre bundles extend through the entire thickness of the sheet;
applying a glue to the sheet; and
curing the glued sheet.

2. The method as claimed in claim 1, wherein the glue is chosen such that a tensile strength of the cured sheet substantially matches that of a first material.

3. The method as claimed in claim 1, wherein the glue is chosen such that a thermal expansion coefficient of the cured sheet substantially matches that of a second material.

4. The method as claimed in claim 3, wherein the second material is a further component of the composite material.

5. The method as claimed in claim 4, wherein the composite material comprises reinforced concrete.

6. The method as claimed in claim 2, wherein the first material comprises one or more materials selected from a group consisting of steel, carbon, glass, bamboo, hemp, and sisal.

7. The method as claimed in claim 6, wherein the glue comprises one or more materials selected from a group consisting of resin, hardener, PE, VE, PU, and [epoxy.

8. The method as claimed in claim 1, wherein the sheet is not subjected to carbonization prior to the application of the glue.

9. The method as claimed in claim 1, wherein the separating comprises splitting using a wedge disposed at about 90° to the fiber direction and applying a relative rotational movement around an axis parallel to the fiber direction between the wedge and the bamboo culm.

10. The method as claimed in claim 1, wherein the glue is applied to a plurality of sheets, and the plurality of glued sheets are cured together to form a multi-sheeted composite material for the structural applications.

11. The method as claimed in claim 1, further comprising a pre-treatment step for the bamboo culm to facilitate separating the sheet from the bamboo culm, wherein the pre-treatment step optionally comprises boiling the bamboo culm.

12. The method as claimed in claim 1, wherein the detaching comprises feeding the sheet into a roller press.

13. The method as claimed in claim 1, wherein the cured glue fills a gap between at least partially un-attached adjacent fiber bundles of the sheet along the longitudinal axis of the sheet.

* * * * *